350-167 CROSS REFERENCE SEARCH ROOM

340/146.3

X2565

Jan. 26, 1965 L. R. BROWN 3,167,741

AUTOMATIC CHARACTER READOUT SYSTEM

Filed Feb. 26, 1960 3 Sheets-Sheet 1

INVENTOR.

Laurence R. Brown

Jan. 26, 1965 L. R. BROWN 3,167,741

AUTOMATIC CHARACTER READOUT SYSTEM

Filed Feb. 26, 1960 3 Sheets-Sheet 2

*INVENTOR.*

Laurence R. Brown

INVENTOR.

Laurence R. Brown

United States Patent Office 3,167,741

Patented Jan. 26, 1965

3,167,741
AUTOMATIC CHARACTER READOUT SYSTEM

Laurence R. Brown, Berwyn, Pa., assignor, by mesne assignments, to Drexel Dynamics Corporation, Philadelphia, Pa., a corporation of Pennsylvania Filed Feb. 26, 1960, Ser. No. 11,206
4 Claims. (Cl. 340—146.3)

Figure 1:
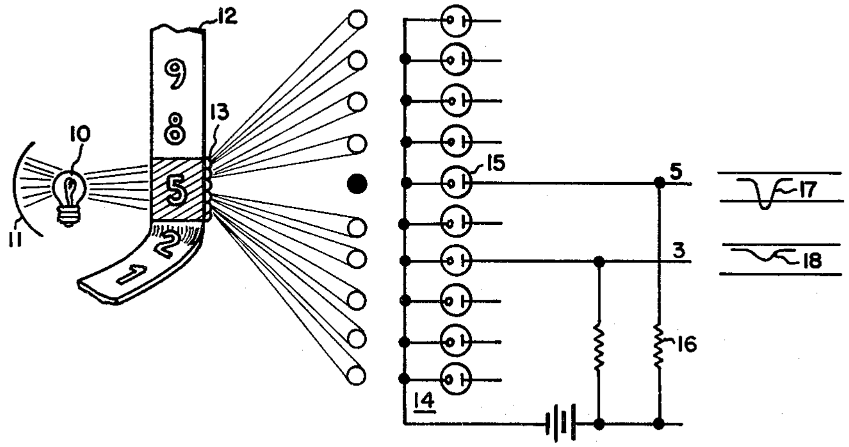

This invention relates to means for reading pattern shapes such as found in printed text, and more specifically it relates to means for processing data automatically from printed documents without human intervention.

Input data to high speed computing systems is prepared manually because of the lack of appropriate automatic equipment. Even though character recognition apparatus has been suggested in the prior art, many desirable system features could not be realized because of limitations inherent in the reading method and the complexity of processing equipment.

One primary restriction in systems requiring recognition of a plurality of different characters in a set is the necessity both for producing a time base or scanning procedure to recognize the presence of a character, and in addition for providing means to recognize which character is present. This means an input document must be synchronized in action with an electronic system, thereby imposing considerable dependency upon exacting mechanical tolerances in document handling equipment. Also, in many cases, input data must be carefully spaced.

It is, thus, an object of the invention to provide reading means asynchronously responsive to presentation of a character so that it can be detected statically without dependence upon either a carefully controlled presentation speed or character spacing requirement.

In automatic data processing equipment, it is desirable to remove as many restrictions in a character reading as possible. Prior techniques require the character to be held in position either electrically or mechanically while scanning until a decision is made. This slows down the processing rate. Thus, many processing steps are required before a decision is reached, whereas an immediate decision could be made with a technique removing the dependency upon synchronous presentation.

Another object of the invention is to provide equipment for recognizing a character as soon as it is presented without awaiting logical processing of data or requiring multiple decisions.

Automatic reading systems sometimes encounter characters so distorted by smudging or lack of definition that they may be difficult to recognize. The recognition system, therefore, should be capable of making a simple decision that an unknown character exists when the character is not completely recognized.

In this respect, it is also desirable to produce means whereby similar patterns having various degrees of definition may be handled. For example, typewritten text may contain considerable fuzziness, dependent upon ribbon and paper quality, etc. Typed characters may also be misaligned considerably. Thus, the reading method should not require critical character registration.

Accordingly, a further object of the invention is to produce an automatic indication of the presence of a character, as well as a selection of the character identity.

Also, an object of the invention is to produce means for reading characters which means are not dependent upon either extremely well defined text or carefully aligned characters.

A general object of the invention is to produce improved reliable means for reading characters simply.

The improved automatic character readout features encompassed by this invention are realized by incorporation of the techniques disclosed in my copending patent application S.N. 851,048, filed for Character Recognition Means on November 5, 1959, and assigned to the same assignee. Those features of the copending application necessary for an understanding of the present invention are included in this specification.

In accordance with this invention, therefore, a simple optical pattern comparison method of detecting characters statically is employed. By use of a special optical system, it is possible to multiplex a plurality of message patterns in a common character position having the same dimensions as the character pattern to be recognized. This optical system permits detection of one of a plurality of patterns, such as a numerical digit from 0 through 9, at a single viewing position, without requiring scanning or dynamic detection techniques. In order to remove precise manufacturing tolerance requirements, the lens system comprises a set of miniscule lenses termed lenticules, which are located close to the viewing surface upon which the comparison patterns are stored to thereby direct information from each of the different stored patterns to a single detection station at which a photocell may be located. Thus, detection of the pattern shape is accomplished at the optical level by static techniques rather than in complex electronic processing equipment dependent either upon dynamic properties produced while scanning portions of the character or upon decisions based upon the presence of a required set of samples existing at a specific time.

With the immediate detection of different characters produced by this technique, bypassing the need for scanning or synchronous operation in the detection operation, simple data processing equipment can be used. Thus, the different characters produce independent static signals at a plurality of photocells. In the case of numerical digits, one out of ten photocells will indicate the selected digit whenever the digit is presented. The indication persists as long as the digit is present, and may be developed quite rapidly as digits are moved quickly past the viewing position. There is no necessity for sprocketing the motion to assure proper timing or scanning. Thus, characters may be immediately viewed, printed, stored, or fed into a data processing system by use of such simple equipment as a photo operated relay.

Figure 3:
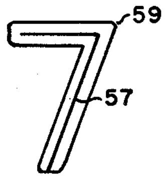
Figure 4:
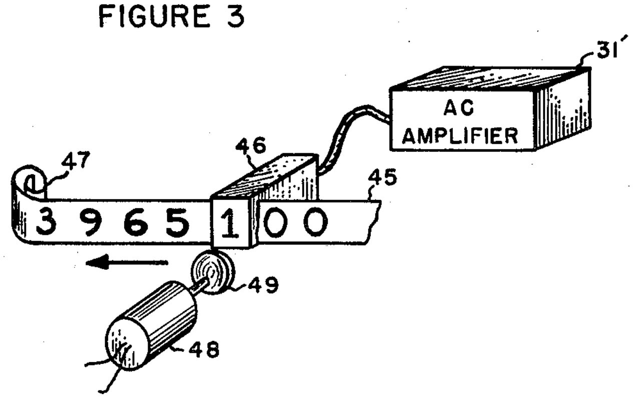
Figure 2:
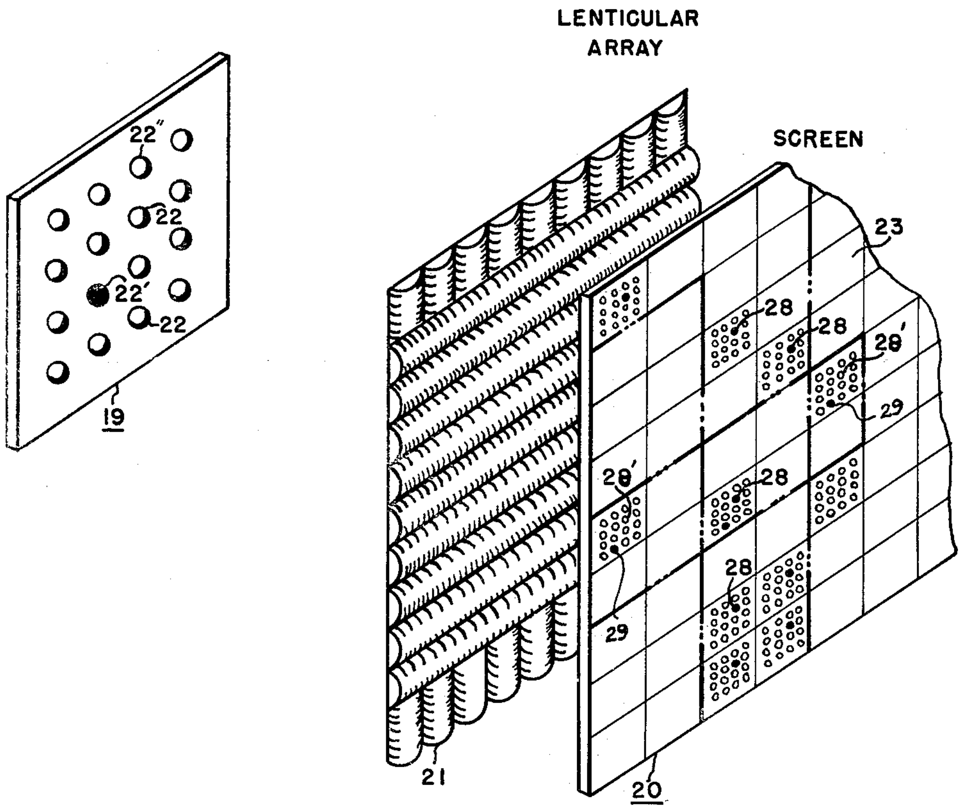
Figure 5:
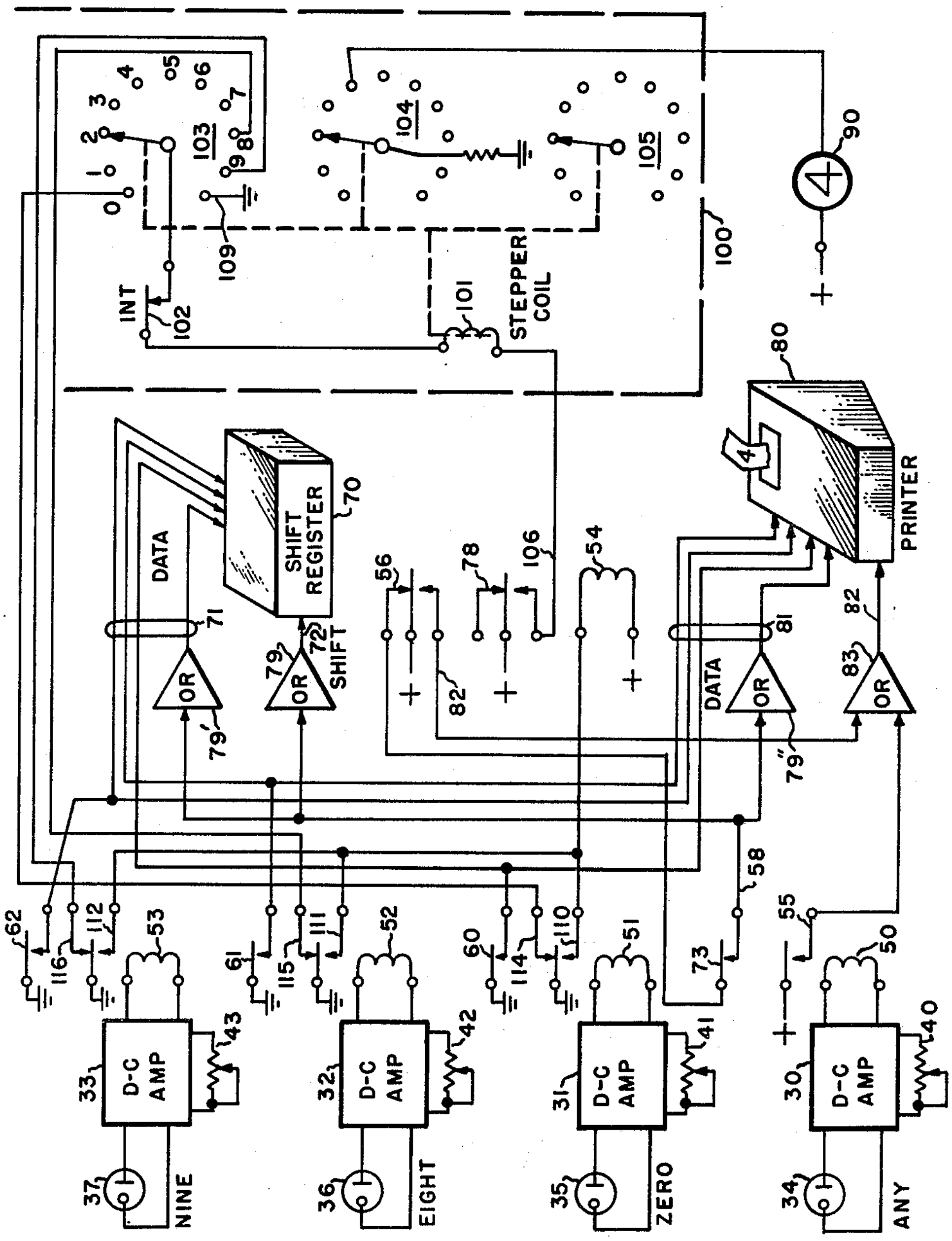

Specific aspects of the invention and the various features and advantages are discussed hereinafter in detail with reference to the accompanying drawing, wherein:

FIGURE 1 is a diagrammatic assembly view of an optical character recognition system as used in accordance with the invention, FIGURE 2 is an explanatory sketch illustrating the method of detecting various patterns in accordance with the teachings of this invention, FIGURE 3 is a detailed view illustrating the manner of matching patterns in accordance with this invention, FIGURE 4 is a sketch illustrating registration means provided in accordance with the invention, and FIGURE 5 is a schematic diagram of an automatic recognition system embodying the invention.

Referring now to the drawings, FIGURE 1 illustrates the mode of operation afforded by the invention. A radiant energy source such as light bulb 10 provides power for operation of the system to the exclusion of wires, solder terminals and complex electrical equipment. A parabolic reflector 11 may be used to concentrate the energy upon the viewing surface to be used.

The source of character patterns to be recognized are shown upon the paper strip 12. The strip 12 may be moved to present different characters at the viewing station (shown with the figure five in registration) for recognition. Ordinary printed or typed letters upon paper are quite adequate as a pattern source.

Upon the lenticule plate 13, a plurality of photographic image patterns are stored. The lenticule system is similar in construction and operation to that described in detail in the U.S. Patent 1,984,004 issued to E. Wildhaber, December 11, 1934. The detailed constructional features may be found in that patent and are not included herein since they might tend to obscure the nature of the present contribution. Briefly, the patent outlines a lenticular optic system presenting different images at several points, and the converse method of presenting several images at the same viewing surface responsive to light sources at different locations. At the present time, these methods are used extensively in production of visual displays to present different patterns upon relative movement of an observer's eye or the relative actuation of a light source angle.

In the present invention, the lenticular display is used to provide a set of photographically stored patterns of discrete shapes, such as numerals, and to produce at individual positions in the photocell bank 14 light emanating from the bulb 10 as passed through respective ones of the stored patterns. If desired, light may be reflected from the message bearing surface into the lens assembly at the viewing station.

As shown in the viewing position, the numeral 5 is presented for matching a complementary stored 5 pattern on the lenticule plate 13. In this manner, substantially all light is omitted from the corresponding photocell 15 to produce a detectable null pattern at viewing resistor 16 in the manner displayed in waveform 17. Light will pass through all other patterns to actuate the remaining photocells. Conversely similar patterns stored on the message screen may be used to cause dimming of light passing through all but the single path identifying the selected character.

It is difficult to visualize the superpositions of the patterns in FIGURE 1, but this will be explained in connection with FIGURE 2. The effect of presentation of the character 5 may tend to lessen the light through another character position such as 3 as indicated by waveform 18, but a null upon complete match is easily distinguished as indicated at photocell 15. As a matter of fact, a threshold of any desired value may be provided in conjunction with the photocell detector to permit a certain amount of pattern deterioration before rejecting a character.

The lenticular system as shown in FIGURE 2 provides for two dimensional sensing of a field of sixteen patterns at sixteen different discrete positions in the viewing position plane 19. This is representative of an easily achieved grouping at the present state of the art. The photographically stored pattern is formed of many small dots as shown upon the screen 20. The lenticular array 21 may be used in both writing the images and in recognizing the patterns.

For a better understanding of the reading method, consider first the writing method. Assume a negative pattern to be introduced between the light viewing plane 19 and the screen 20. Position a plurality of lamps at the discrete positions 22 in the viewing plane. The lenticular array 21 has a plurality of small lenses each substantially corresponding to a spherical lens formed by a semicylindrical horizontal and vertical rib coordinate. Depending upon the light source angle, the lenses serve to define a discrete position in each cell 23 on the screen. Thus, a grouping of sixteen individual spots are formed in each cell.

Assume the light at the darkened position 22' is on. Then as shown in the outlined character one on the screen 20, each corresponding position within the pattern definition is stored. Similarly other lamps store patterns in other dot positions. The screen has a photo emulsion surface so that the patterns are stored photographically.

Now conversely place the character one to be recognized upon the screen 20 in registration with the outlined character. In each dot 28 corresponding to position 22' within the one is a transparent image while outside the corresponding dots 28' will be opaque. Thus, if the character is dark throughout this outlined pattern, there is no light passed through to a photocell placed at position 22'. Conversely, no other set of dots corresponding to any other position 22 will be completely masked, so that light will be focused by the lenticular array 21 upon every other position 22.

Consider the outlined dash across the central portion of character one to recognize the distinction between two partially overlapping characters. As may be seen, the dash is defined by a position 22'' on the position plane 19. Upon superimposing the dash pattern over the outlined dash image stored upon the screen 20, only the position 22'' will become darkened since light to position 22' will be passed through unblocked positions 28 within the field of character one. Conversely the dash has some area not common to the one such as spots 29 so that presentation of the one will permit light to pass to the dash photocell located position 22''. In practice it is not difficult to choose a set of conditions which will permit distinction of a relatively large number of standard character pattern shapes.

By viewing the screen 20 of FIGURE 2 it is recognized that many messages may be multiplexed on the same screen area, thereby permitting recognition of multiple characters at a single viewing screen the same size as a single character. This permits the screen to be extended for reading an entire line at one time without space limitation.

In the present state of the art, the lenticular ribs are spaced 60 per inch or more to provide a cell density of 3600 per square inch on the screen 20. Accordingly, each image is made up of a large number of dots, and complete detailed registration of every character in exact size and shape need not be required. For example, assume only a character skeleton to be stored upon the screen 20. This will permit extrtmely fuzzy and partially missing characters to be identified without ambiguity.

This method of producing uncritical registration requirements exceding the inherent capabilities of the system is that explaned in connection with FIGURE 3. For the map comparison technique used herein the written pattern 57 in the reading head is skeletonized to provide only the central outline of the character. By matching an "unknown" pattern 59 with the written pattern 57 considerable leeway is afforded in proper positioning without significantly decreasing the individual characteristic features of the pattern. This change of size is used for viewing a black character on white background by a complementary pattern. By using a similar pattern the character pattern would be fattened rather than skeletonized.

It is significant that even though the character image dots are close together, the system is entirely uncritical in manufacturing tolerance. Thus, with the dimensions discussed, dots closer together than .005 inch may provide patterns on the viewing plane with a diameter of about .2 inch spaced at one-eighth inch intervals. This permits ready detection without any critical positioning of parts. Similarly any lens irregularities are compensated for by writing and reading with the same set of lenses in a fixed relative position with the screen 20.

As hereinbefore discussed, the present method of character recognition does not impose critical registration requirements. In fact it lends itself to techniques less exacting than with other known methods.

Consider the sketch in FIGURE 4 wherein the carrier strip 45 is passed by the reading assembly 46 to be wound on coil 47. Asynchronous operation permits the spacing of characters or speed of presentation to vary as the strip 45 moves along an axis in the direction of the arrow. In the case of typewritten text considerable leeway in character alignment and spacing may exist. The simple expedient shown by FIGURE 4 may be used to permit extremely broad tolerances in registration. Thus, motor 48 operates cam 49 to vibrate the reading head 46 relative to the carrier strip 45 substantially normal to the direction of reeling. Since the detection method is static, depending upon a pattern match, a vibration amplitude may be chosen to register any misaligned character falling within the field of view provided. This superimposes on A.-C. signal component upon the detected signal which may be filtered out or used to advantage with A.-C. coupled amplifier circuits. Such an amplifier indicated at 31' is tuned to the vibration frequency superimposed upon the detection signal by cam 49.

The lenticular lens array 13 shown in FIGURE 1 contributes significantly to this vibration mode of registration since a small amount of vibration does not significantly change the angle to which the detection devices are sensitive. Thus, only a small lens assembly need be moved and there is no danger of shaking wired connections loose or of fracturing paper. Also, the weight to be moved is small.

Automation of the reading process results in many functional advantages by using the foregoing techniques in a system such as shown schematically in FIGURE 5. Readout amplifiers 30 through 33 are provided for the various photo detectors 34 through 37. Typical amplifiers and processing channels are shown for numerical digits 0, 8, and 9, it being understood that channels for the remaining digits are handled in a similar manner. By means of threshold adjustments 40 through 43, the gain of the respective amplifiers may be set to select the desired pattern and reject all other patterns.

By use of D.C. amplifiers independence from any speed requirement in sampling or presentation of the character is eliminated. Thus, the relay 50 is closed by amplifier 30 as long as a character is presented at standstill to photocell 34. This is advantageous for start-stop feed of characters, where one need not be concerned whether reading stops on a character or not. Even asynchronous jerking superimposed upon document feed does not interfere with sensing. This permits a reading head to be mounted directly upon a card punch, or the like, for reading characters as the document is passed from one punch column to the next. In this mode the character size or position need not be synchronized either with character motion or static presentation.

The channel including photo detector 34 and amplifier 30 serves to detect the presence of any character 0 through 9 or any portion thereof. Adjustment 40 serves to set the amplifier sensitivity high enough that even a partial character appearing at the viewing station will actuate output relay 50 to change the positions of its contacts. Thus, a signal will appear on lead 55 indicative of the presence of a character whether or not a detection is made in channels 0 through 9. This signal will permit a non-select signal to be produced at lead 58 by way of contact 56 on relay 54. Any detected character in channels 0 through 9 will serve to operate relay 54 through output contacts 110, 111, 112 to override the non-select signal by opening contact 56.

Contacts on relays 50 through 53 are used as shown in this embodiment to use recognized characters in various ways for data processing or remote readout. Exemplary of readout devices are the buffer shift register memory 70, the printer 80, the visual remote indicator 90, and the storage register switch 100. All of these devices are operated automatically in response to presentation of a single character at the viewing station. It is recognized that the relay switching and logic circuits shown may be replaced by corresponding high speed electronic switches and logic devices where utilization systems so require. The speed limitations of this automatic system for recognizing characters is limited only by response time of the circuit elements and the ability to present characters at the viewing station at high speeds, since a single glance will provide recognition without extensive logical processing or time-dependent operations.

Consider the requirement for entering data into a computer system by means of shift register 70. This shift register may be of conventional type and serves as a buffer memory for holding the decoded data until required for entry into appropriate data processing channels. Input leads 71 produce either signal data for the various characters or a "no-read" signal via lead 58, while the shift lead 72 advances each reading upon return to positive of contacts 56 via contacts 73, thereby preparing the register for receiving the next entry. The OR circuit 79 serves to prevent interaction between the different input levels at lead 58 and is used in the various leads.

Alternatively, the information that is read by photocells 34 through 37 may be printed out at printer 80. This amounts to a data logger for monitoring transactions at a remote installation such as a bank branch. Thus, data readings are entered at leads 81 and a printout command is given by operation of relay 54 to energize lead 82. OR circuit 83 permits printout of a no-read indication appearing upon energization of lead 55. The printer device 80 may be a standard electrical input device such as Model P5 supplied by the Clary Corporation or equivalent.

By temporarily storing recognized information, visual readout devices (such as an indicator tube 90 of the type manufactured by the Burroughs Corporation and known by the trademark "Nixie") may be actuated to retain information between instantaneous reading intervals as characters are presented to a viewing station. This type of operation is effected in stepping switch 100 which may be a standard Automatic Electric stepping switch with stepping coil 101, interruptor contacts 102 and several banks 103, 104, 105 of contacts operable through 11 steps.

In operation, the one out of ten signals produced by relays 51, 52, 53 in response to numerical characters 0 through 9, actuate relay 54 as each character is recognized. This relay through contact 106, closes the circuit through stepping coil 101, interruptor contacts 102, switch bank 103 and those contacts 114 through 116 except upon the single actuated relay in the set 51, 52, 53. The interruptor contacts permit the switch to step from position to position by action of homing bank 103 until an open circuit exists by way of the selected character and open circuit contact 114, 115, or 116. Contacts on switch 100 remain in this position until another character is selected and relay 54 operates by action of contacts 110, 111 or 112 to energize the stepping coil 101 again.

As may be seen from the typical character 4 displayed upon tube 90, bank 104 of stepping switch 100 produces a visual indication of the character recognized last. Bank 105 may be used for actuating other signal channels, as desired. Thus, a temporary memory is provided by switch 100 for holding data between readings. It is noted that the character must be retained in viewing position long enough in this mode of operation for the switch 100 to home to the selected position, whereas the shift register 70 and printed 80 instantaneously register the reading in asynchronous fashion. With the switch 100, an extra terminal 109 is provided on each bank, and this is bypassed during homing action by a permanent connection shown as ground. No provision is made in this switching mode, as shown for visual readout or indication of a no-read signal, but this can be provided by modifications of the logic to home on contact 109 with operation of relay 50, if so desired.

It is accordingly seen from the foregoing description of embodiments of the invention that significant functional advantages are afforded in operation. An integrated automatic system, therefore, is produced which is not exacting in registration requirement, and which requires no complex timing or decoding operations. Novel features of the invention permitting the presently described advance in the state of the art are defined with particularity in the following claims.

I claim:

1. In a character recognition system; a reading station having a light source, a lenticular lens array, a pattern screen, and a plurality of light-responsive devices; said pattern screen having a plurality of pattern characters stored thereon within a common area in superimposed interlaced fashion, each pattern character being formed of an array of spaced-apart dots each of which occupy dot positions separate and distinct from and interlaced with those of the other pattern characters; said lenticular lens array being positioned closely adjacent to said pattern screen; means for transporting through said reading station a carrier having thereon characters to be recognized, each of said plurality of light-responsive devices being positioned to receive light rays from said source, as modified by said carrier and the characters thereon, which pass through said lenticular array and through a different array of dot positions on said pattern screen associated with a different one of said pattern characters; a plurality of threshold-adjusted sensing circuits each instantaneously responsive to the amount of light reaching a different one of said light-responsive devices for sensing that the amount of light which has reached a particular one of said light-responsive devices is beyond a threshold value; and asynchronous output means coupled to said sensing circuits for developing and delivering an output signal in substantially instantaneous response to sensing that the amount of light at one of said light-responsive devices is beyond the threshold value.

2. Apparatus as claimed in claim 1 characterized in that means are provided at said reading station for reciprocating said carrier in a direction normal to its direction of transportation through said reading station.

3. In a character recognition system; a reading station having a light source, a lenticular lens array, a pattern screen, and a plurality of light-responsive devices; said pattern screen being opaque but having a plurality of transparent characters stored thereon within a common area in superimposed interlaced fashion, each pattern character being formed of an array of spaced-apart transparent dots each of which occupy dot positions separate and distinct from and interlaced with those of the other pattern characters; said lenticular lens array being positioned closely adjacent to said pattern screen; means for transporting through said reading station between said light source and said lenticular array a transparent carrier having thereon opaque characters to be recognized, each of said plurality of light-responsive devices being positioned to receive light from said source passing through said carrier, through said lenticular array, and through a different array of dot positions on said pattern screen associated with a different one of said pattern characters, whereby, in the event there is correspondence between a character being read and one of said patterns, a minimum amount of light reaches one of said light-responsive devices, each of the other light-responsive devices receiving a greater amount of light; a plurality of threshold-adjusted sensing circuits each instantaneously responsive to the amount of light reaching a different one of said light-responsive devices for sensing that a minimum amount of light has reached a particular one of said light-sensitive devices; and asynchronous output means coupled to said sensing circuits for developing and delivering an output signal in substantially instantaneous response to the sensing of said minimum amount of light at one of said light-responsive devices.

4. Apparatus as claimed in claim 3 characterized in that means are provided at said reading station for reciprocating said carrier in a direction normal to its direction of transportation through said reading station.

References Cited in the file of this patent

UNITED STATES PATENTS 2,933,246 Rabinow --------------- Apr. 19, 1960